United States Patent [19]

Craigie

[11] 4,336,344

[45] Jun. 22, 1982

[54] COMPOSITIONS OF THERMOSETTABLE RESINS AND POLYDIENE RUBBERS HAVING IMPROVED SOLUTION STABILITY

[75] Inventor: Laurence J. Craigie, Broken Arrow, Okla.

[73] Assignee: The Dow Chemical Company, Midland, Mich.

[21] Appl. No.: 295,358

[22] Filed: Aug. 24, 1981

Related U.S. Application Data

[63] Continuation-in-part of Ser. No. 160,798, Jun. 19, 1980, abandoned.

[51] Int. Cl.$^3$ .................... C08L 63/00; C08L 67/06
[52] U.S. Cl. .................................... 525/31; 525/44; 525/90; 525/91; 525/531
[58] Field of Search .................... 525/31, 44, 90, 91, 525/531

[56] References Cited

U.S. PATENT DOCUMENTS

| | | | |
|---|---|---|---|
| 3,621,093 | 11/1971 | Svoboda | 525/31 |
| 3,674,893 | 7/1972 | Nowak | 260/836 |
| 3,740,353 | 6/1975 | Patrick | 260/2.5 N |
| 3,793,398 | 2/1974 | Hokamura | 525/31 |
| 3,808,114 | 4/1974 | Tsuchihara | 525/31 |
| 3,825,517 | 7/1974 | Ficarra | 525/31 |
| 3,836,600 | 9/1974 | Brewbaker | 260/836 |
| 3,857,812 | 12/1974 | Nowak | 260/40 R |
| 3,887,515 | 6/1975 | Pennington | 260/40 R |
| 3,892,819 | 7/1975 | Najvar | 260/836 |
| 3,928,491 | 12/1975 | Waters | 260/837 |
| 3,947,422 | 3/1976 | Tatum | 260/42.52 |
| 3,968,016 | 7/1976 | Wismer | 525/44 |
| 4,151,219 | 4/1979 | Brewbaker | 260/836 |

*Primary Examiner*—Paul Lieberman

[57] ABSTRACT

The stability to phase separate solutions of unsaturated polyesters, vinyl ester resins or mixtures thereof and an elastomeric additive is improved by the use of a compatibilizing agent which is the ester of a carboxyl terminated diene polymer and a polyoxyalkylene.

13 Claims, No Drawings

COMPOSITIONS OF THERMOSETTABLE RESINS AND POLYDIENE RUBBERS HAVING IMPROVED SOLUTION STABILITY

CROSS REFERENCE TO RELATED APPLICATION

This application is a continuation-in-part of my copending application, U.S. Ser. No. 160,798, filed June 19, 1980 now abandoned.

BACKGROUND OF THE INVENTION

The subject matter of this invention broadly relates to reinforced plastics having impact resistance, uniformity of pigmentation, smooth surfaces (low profile) and good paintability. More specifically, it relates to unsaturated polyester or vinyl ester resin compositions containing certain polydiene rubbers and thermoset articles prepared therefrom.

Brittleness in reinforced plastics is a serious problem and a practical deterrant to their use in the manufacture of a variety of articles, such as car fenders, etc., where the highest possible impact resistance is essential. Currently, some manufacturer specifications for reverse impact properties make it difficult for most commercially available resins to be approved for such uses. In addition, other factors are of prime importance, (1) the resin should be capable of providing the smoothest possible surface to minimize the costs of surface preparation (sanding, etc.) for painting, (2) paint should adhere well to the molded article and (3) the resin should be capable of producing uniformly pigmented (non-mottled appearance) articles.

Attempts have been made to improve the surface properties (low profile characteristics) by incorporating into a resin such as an unsaturated polyester, a thermoplastic such as polymethyl methacrylate or polystyrene. Improvements in surface smoothness may be obtained, but paintability and/or impact strength are not improved. In addition, such resins pigment poorly and at best only light pastel colors have been possible. Attempts to prepare dark, molded colors have not been successful.

To overcome some of those problems, it was proposed in U.S. Pat. Nos. 3,674,893 and 3,857,812 to employ certain polydiene rubbers as an additive to vinyl ester resins and unsaturated polyesters. Those polydiene rubbers exhibited the desired beneficial results property wise. However, the solutions of resin and rubber were frequently so unstable as to phase separate in a short time. As a consequence, it was necessary to restrict the rubber additive to those of a stated range of viscosity and molecular weight. Also, it required the solutions to be either prepared immediately before use or to employ continuous stirring to maintain the single phase character of the solution. The improvement of the solution stability of such compositions would be of considerable benefit to their utilization in commerce.

SUMMARY OF THE INVENTION

The solution stability of compositions of an unsaturated polyester, a vinyl ester resin or a mixture of those two ingredients and a polydiene rubber is improved with the addition of a small amount of a compatibilizing agent that is a triblock polymer having an elastomeric central block and having side blocks of a polyether.

DETAILED DESCRIPTION OF THE INVENTION

Generally, in the preparation of suitable unsaturated polyesters, an ethylenically unsaturated dicarboxylic acid such as maleic acid, fumaric acid, itaconic acid or the like is interesterified with an alkylene glycol or polyalkylene glycol having a molecular weight of about 1,000 to 8,000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$-unsaturated dicarboxylic acid. It will be understood that the appropriate acid anhydrides, when they exist, may be used and usually are preferred when available.

The glycol or polyhydric alcohol component of the polyester is usually stoichiometric or in slight excess with respect to the sum of the acids. The excess of polyhydric alcohol seldom will exceed 20-25 percent and usually is about 2 to 10 percent.

These unsaturated polyesters may be generally prepared by heating a mixture of the polyhydric alcohol with the dicarboxylic acid or anhydride in the proper molar proportions under known conditions. It is also possible to prepare unsaturated polyesters directly from the appropriate oxide by copolymerization with an anhydride, e.g., propylene oxide can be used in place of propylene glycol and copolymerized with maleic anhydride or a mixture of maleic anhydride and phthalic anhydride.

Vinyl ester resins are generally prepared by reacting together about equivalent amounts of an unsaturated monocarboxylic acid and a polyepoxide. An early patent, U.S. Pat. No. 3,179,623, describes the above reactions and resins. Further details about the resins, which are called vinyl ester resins herein, and conditions and methods of making them can be found in the following U.S. Pat. Nos.: 3,301,743; 3,317,465; 3,377,406; 3,256,226 and 3,367,992. All the above patents are incorporated herein by reference.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having equivalent weights per epoxide group of about 150 to 1,500, preferably about 250 to 700 and more preferred about 400 to 600. Generally, as the epoxide equivalent weight decreases, the amount of carboxy terminated rubber increases. The polyepoxides are characterized by the presence of more than one epoxide group per molecule.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms. Said acid is generally reacted with the polyepoxide in the proportions of about 1 equivalent of acid per each equivalent of epoxide, but the proportions of equivalents may range from about 0.8/1 to 1.2/1, respectively.

Mixtures of unsaturated polyesters and vinyl ester resins are also contemplated for use herein. Such mixtures may find use in applications where the good reactivity and chemical stability of the vinyl ester resin and the increased crosslinking potential of the polyester are needed.

Unsaturated polyesters and vinyl ester resins are usually viscous liquids which are difficult to employ in conventional fabrication techniques. Accordingly, it is commonplace with these thermosettable materials to blend therewith a copolymerizable monomer of low viscosity as a reactive diluent.

A variety of copolymerizable monomers are available and suitable and include alkenyl aromatic monomers, alkyl esters of acrylic and methacrylic acid, vinyl acetate, acrylonitrile, diallyl maleate, diallylphthalate, acrylic and methacrylic acid, and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene and the like.

The polydiene rubber is a polymer having rubbery characteristics which enhance the physical properties of the resin to which it is added. Preferred additives are (1) the polymers of conjugated dienes which are homopolymers and copolymers of said dienes and (2) copolymers of conjugated dienes and at least one other copolymerizable monomer different from said diene. Conjugated diene monomers include butadiene, isoprene, chloroprene, the various halo- and alkyl-substituted derivatives thereof and like monomers. Mixtures of said diene monomers are frequently used to impart certain desired properties to the polydiene rubber.

Copolymerizable monomers useful to form copolymers with the diene monomer include nitrile monomers, such as acrylonitrile and methacrylonitrile and alkenyl aromatic monomers, such as styrene, alphamethyl styrene, vinyl toluene or the halo- and alkyl-substituted styrenes, such as chlorostyrene or t-butyl styrene. Preferred copolymers include butadieneacrylonitrile copolymers. In all such copolymers, it is usually necessary to have at least 30 weight percent diene monomer in the polymeric structure to achieve elastomeric properties. Many such polymers and copolymers used to enhance the properties of unsaturated polyesters are described in U.S. Pat. No. 3,857,812. In that patent, it is noted that certain viscosities and molecular weights are critical to attain solution stability. The use of such diene polymers with vinyl ester resins is described in U.S. Pat. No. 3,674,893 with the same limitations to attain stability.

It is an advantage of this invention that the compositions can be prepared with a much broader range of rubber compositions with adequate solution stability than has been heretofore possible. For example, the previous compositions employing polybutadiene or butadiene/acrylonitrile copolymers having low acrylonitrile content will phase separate very quickly; however, when the compatibilizing agent of this invention is included, the compositions have an acceptable solution stability and will remain stable for practical time periods.

To achieve the desired property improvements, the polydiene rubber should generally constitute about 5 to 15 weight percent of the combined weight of polyester and/or vinyl ester resin plus additive with the resin being the remainder. To be usable in most fabrication procedures, the 95 to 85 weight percent resin phase will consist of from 25 to 70 weight percent polyester or vinyl ester resin and from 75 to 30 weight percent of a copolymerizable monomer as a reactive diluent.

The resin compositions may also include inert fillers, such as clay, which are frequently added to thermosettable resin systems in order to impart certain properties such as weatherability or for reasons of economics. Reinforcing materials, such as woven or nonwoven glass mats, are also commonly employed in commercial practice. Such materials can be included in the present concept without disturbing the benefits thereby attainable.

The compatibilizing agent of this invention is a triblock polymer having an elastomeric central block and side blocks of a polyoxyalkylene ether. One embodiment of the compatibilizing agent is a diester of a carboxyl terminated elastomer and a polyglycol ether, preferably a monoether thereof. The carboxyl terminated elastomers to be used as the central block of the agent are preferably those liquid carboxyl terminated polydienes described in U.S. Pat. No. 3,892,819. In that patent, the liquid polymers are noted as being of low molecular weight of from about 2,000 to 20,000 and preferably about 3,000 to 10,000. In the patented concept, the rubbers are an ingredient used in making a modified vinyl ester resin. The present invention utilizes the rubber as a starting material to make the composition of this invention.

The diene used in the carboxyl terminated polydiene block of the compatibilizing agent may have from 4 to 12 carbon atoms, preferably 4 to 8. Typical dienes include 1,3-butadiene, isoprene, piperylene, methyl pentadiene, 3,4-dimethylhexadiene-1,3 and others. The polydienes may be homopolymers of any of the dienes or copolymers of two or more of the dienes. The polydiene may also be a copolymer of a conjugated diene and a copolymerizable vinyl monomer. Suitable comonomers include the alkenyl aromatics, such as styrene, vinyltoluene, α-methyl styrene and the like or nitriles such as acrylonitrile or methacrylonitrile. Such copolymers should contain at least about 30 weight percent diene to attain elastomeric properties. The most advantageous dienes are those of butadiene-acrylonitrile copolymers. The carboxyl terminated polydienes are commercially available materials or are readily prepared by known procedures.

A convenient method for making the diester is to esterify the carboxyl terminated polydiene with a monoether of a polyoxyalkylene material having a molecular weight of from about 200 to about 4,000. The polyoxyalkylene material is a polyoxyethylene, a polyoxypropylene or a polyoxy(ethylene/propylene). The monoether group may be an aliphatic saturated or unsaturated alcohol. Typical alcohols useful in capping one end of the polyglycol are allyl alcohol, methyl alcohol and butyl alcohol. Polyoxyalkylene ethers may also be used.

The esters are prepared by conventional esterification procedures. Alternatively, the esters can be prepared by the reaction of the carboxyl terminated polydiene with a large excess of ethylene oxide or propylene oxide to concurrently esterify the polydiene and polymerize the alkylene oxide.

The esters can also be prepared from the carboxyl terminated rubber and a polyglycol to provide an additive with hydroxy termination.

Alternate techniques can be used to form the compatibilizing agent. It is only necessary that a polyoxyalkylene ether moiety be attached to each end of an elastomeric moiety. Thus, a hydroxy terminated elastomer can be coupled with two moles of a hydroxy terminated polyether with a dicarboxylic acid coupling agent. A vinyl terminated rubber can be coupled with a monovinyl terminated polyether.

The compatibilizing agent of this invention is believed to function as an emulsifier between the resin and the elastomer additive. Since the agent is of an elastomeric character itself, it does not detract from the properties of the cured article and, in fact, in many cases, contributes positively to those properties. The increased stability resulting from the present invention permits the use of a wider variety of polydiene rubbers to be employed in thermosettable resin compositions than has been possible heretofore. Also, the increased stability allows the formulator to prepare larger batches of the composition prior to fabrication without the need for continued stirring to maintain the solution.

The compositions of this invention may be readily cured by exposure to ionizing radiation or by admixture of free radical catalysts, such as the well-known peroxides.

The properties of the compositions herein are especially valuable in the preparation of reinforced molded articles where high reverse impact strength, low profile and other properties are required such as in the molding of automotive body and other parts, but the utility is not limited to this one area and includes many other areas such as construction materials, filament wound pipe, furniture, boats, and like areas. The compositions are of general utility in all the areas where unsaturated polyester and vinyl ester resins have been used.

The invention will be more apparent from the following example which illustrates the best mode of carrying out the inventive concept.

EXAMPLE 1

A resin solution of 92.5 grams of a vinyl ester resin of a diacrylate of a diglycidyl ether of bisphenol A and 45 weight percent styrene (sold by The Dow Chemical Company as DERAKANE ®411-45) and 7.5 grams of a liquid carboxyl terminated butadiene-acrylonitrile copolymer containing about 20.5 weight percent acrylonitrile, sold commercially as Hycar 130X18, was allowed to stand. After sixteen hours, there were two separate phases with about 20 percent in the upper phase and 80 percent in the lower phase.

A second solution was prepared by mixing 89.5 grams of the same vinyl ester resin, 7.5 grams of the same copolymer and 3.0 grams of a compatibilizing agent. The agent was prepared by coupling a polyoxyethylene having a molecular weight of 4000 with more of the carboxyl terminated butadiene-acrylonitrile copolymer in the ratio of 3 parts of the former to 1 of the latter. There was no separation of this second solution after standing for seven days.

Similar improvement in stability was observed when the compatibilizing agent was replaced with one prepared from the same copolymer and a monoallyl ether of a polyoxyethylene of molecular weight of 500 or a monoallyl ether of a polyoxyalkylene having a molecular weight of 1,440 and made from a mixture of 80 percent ethylene oxide and 20 percent propylene oxide or a mono-n-butanol ether of a polyoxyalkylene having a molecular weight of 1,800 and made from a 50/50 mixture of ethylene oxide and propylene oxide or a monomethyl ether of a polyoxyalkylene having a molecular weight of 1,800 and made from a 50/50 mixture of ethylene oxide and propylene oxide.

What is claimed is:

1. In a thermosettable resin composition comprising (a) a resin selected from the group consisting of an unsaturated polyester, a vinyl ester resin and a mixture thereof and (b) a carboxyl terminated polydiene rubber, the improvement wherein said composition includes as a compatibilizing agent a triblock polymer which has an elastomeric central block of the same carboxyl terminated polydiene rubber as (b) with the side blocks being a polyoxyalkylene ether.

2. The composition of claim 1 wherein said unsaturated polyester is the water-insoluble reaction product of at least one polyol and at least one polycarboxylic acid of which at least a substantial portion is an $\alpha\beta$-ethylenically unsaturated dicarboxylic acid.

3. The composition of claim 2 wherein said dicarboxylic acid is maleic acid.

4. The composition of claim 1 wherein said vinyl ester resin is the reaction product of about equivalent amounts of a polyepoxide and an unsaturated monocarboxylic acid.

5. The composition of claim 4 wherein said polyepoxide is the diglycidyl ether of bisphenol A.

6. The composition of claim 4 wherein said carboxylic acid is methacrylic acid.

7. The composition of claim 1 wherein said diene polymer is a carboxyl terminated polybutadiene.

8. The composition of claim 1 wherein said diene polymer is a carboxyl terminated copolymer of at least 30 weight percent butadiene with the remainder as acrylonitrile.

9. The composition of claim 1 wherein said polyoxyalkylene ether has a molecular weight of between 200 and 4,000.

10. The composition of claim 1 wherein said polyoxyalkylene ether is a copolymer of ethylene oxide and propylene oxide.

11. The composition of claim 1 wherein said polyoxyalkylene ether is a monoallyl ether of a polyoxyethylene ether.

12. The composition of claim 1 wherein said composition contains a monomer copolymerizable with said resin.

13. The composition of claim 12 wherein said monomer is styrene.

* * * * *